Jan. 6, 1970 G. HÖSCH ET AL 3,487,702
TUNER MECHANISM
Filed Nov. 30, 1966 2 Sheets-Sheet 1

INVENTORS
Günther Hösch &
Herlbert Rummer

BY Spencer & Kaye
ATTORNEYS

INVENTORS
Gunther Hösch &
Heribert Rümmer
BY Spencer & Kaye
ATTORNEYS

United States Patent Office 3,487,702
Patented Jan. 6, 1970

3,487,702
TUNER MECHANISM

Günther Hösch, Nuremberg, and Heribert Rümmer, Ingolstadt, Germany, assignors to Telefunken Patentverwertungsgesellschaft m.b.H., Ulm (Danube), Germany Continuation-in-part of application Ser. No. 310,528, Sept. 23, 1963. This application Nov. 30, 1966, Ser. No. 597,988
Claims priority, application Germany, Sept. 22, 1962, T 22,770; Nov. 24, 1962, T 23,067; Apr. 27, 1963, T 23,917
Int. Cl. F16h 35/18
U.S. Cl. 74—10.27 11 Claims

ABSTRACT OF THE DISCLOSURE

A push button tuner mechanism having a plurality of push buttons at least one of which is rotatable into a plurality of angular positions and carries operating means which, upon depression of said rotatable button, actuates a frequency band selector device so as to cause the device to select a particular frequency band in accordance with the angular position of the push button. Each push button is also associated wtih a separately rotatable knob which can be rotated to select a particular frequency, or channel, within the selected band.

CROSS-REFERENCE TO RELATED APPLICATION

This application is a continuation-in-part of application Ser. No. 310,528, filed Sept. 23, 1963, now abandoned, and assigned to the same assignee.

BACKGROUND OF THE INVENTION

The present invention relates to tuner mechanisms and, particularly to push button tuner for mechanisms for selecting the frequenecy band to be received by a broadcast receiving set capable of receiving a plurality of frequency bands.

The present invention is concerned with a push button tuner mechanism for broadcast receiving sets. Arrangements according to the present invention are intended for use in receiving sets capable of receiving a plurality of frequency bands. According to the present invention, a plurality of push buttons are provided and each is individually adjustable so that when it is depressed it will select a predetermined frequency band which is to be received.

It is already known to provide a push button unit in which three tubular control shafts are arranged coaxially with respect to one another. The inner shaft and the intermediate shaft are each provided with a rotatable knob, while the outer shaft is provided with a lever. The rotatable knobs serve to control, for example, the volume of the received sound signal and/or the fine tuning of the signal associated with the selected channel. The lever is employed for selecting the particular frequency range to be received. The three shafts are fastened to a slide, and a hook is provided which extends from the front plate of the arrangement for effecting a positioning operation, the third shaft being fastened behind this hook. In such an arrangement, there is no possibility of removing this outer shaft or its associated lever in case it should be necessary to replace them. Furthermore, it is not possible, after the unit has been assembled, to add levers to, or remove levers from, some of the slides.

Another known push button type unit permits the switching of the frequency range to be effected directly by turning a push button. The push button is rigidly disposed on a slide and, upon rotation of the push button, the slide is also rotated. Separate operating means for switching a frequency range selector switch are disposed on the slide. Due to the form of construction of such an arrangement, it is not possible to provide the slide with other structural elements which might have a transverse axis for positioning contact springs.

It is a primary object of the present invention to eliminate these drawbacks of the prior art.

Another object of the present invention is to provide an improved channel, or station, selector arrangement for broadcast receivers.

A more specific object of the present invention is to substantially reduce the number of push buttons and knobs required for tuning a multiple band receiver.

Yet a further object of the present invention is to provide a push button arrangement of a type in which the user can readily adapt any push button to select any frequency band.

These and other objects according to the present invention are achieved by a push button type tuner for selecting the frequency band to be received by a broadcast receiving set capable of receiving a plurality of frequency bands. The tuner mechanism primarily includes a plurality of longitudinally movable slides arranged side by side, a plurality of push buttons each supported by a respective one of the slides for longitudinal movement together with its associated slide, at least one of the push buttons being capable of assuming at least two different angular positions with respect to its associated slide, and frequency band selector means movable into a plurality of positions each of which causes a particular frequency band to be selected. The arrangement according to the present invention further includes operating means forming a structural unit with the at least one push button and operatively associated with the selector means for moving the latter into a selected one of its positions when the one push button is depressed, the position selected being determined by the angular position of the one push button.

DETAILED DESCRIPTION

Figure 1:
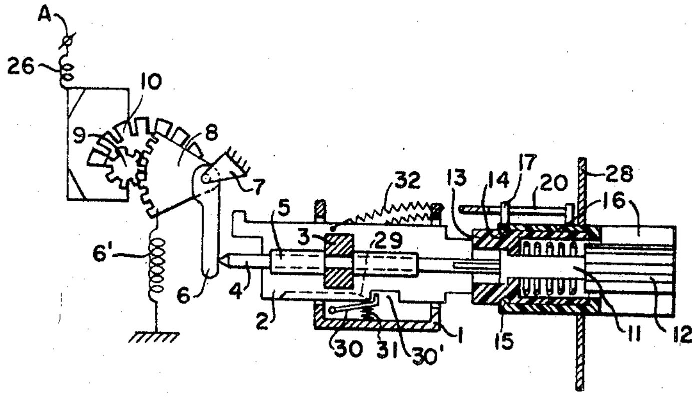
FIGURE 1 is an elevational, cross-sectional view of a push button tuner mechanism according to the present invention.
Figure 2:
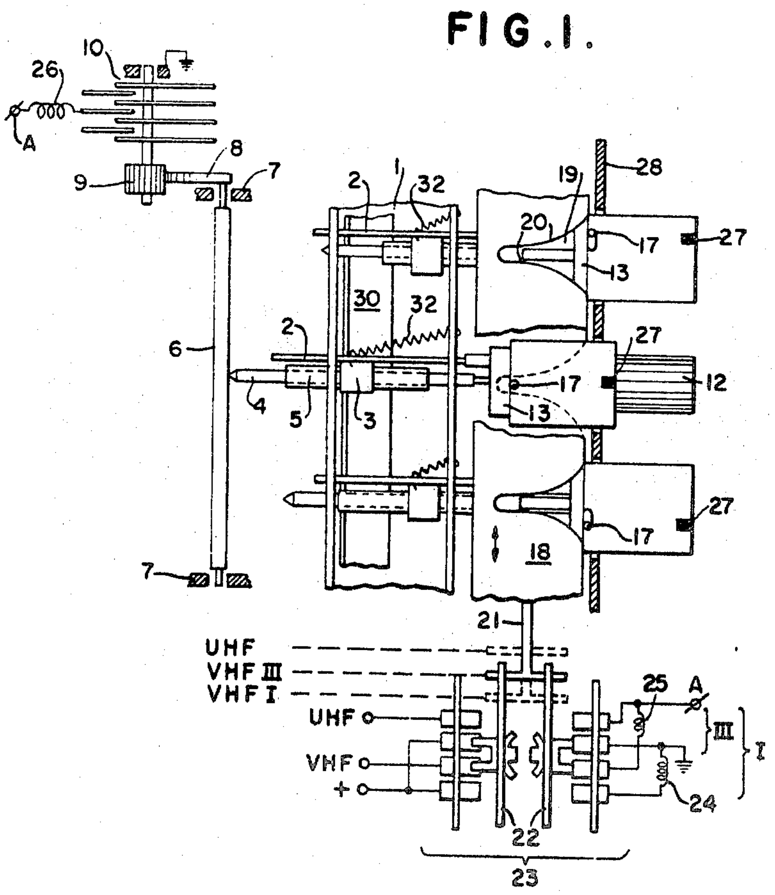
FIGURE 2 is a partly cross-sectional plan view of the arrangement of FIGURE 1.

Referring first to the embodiment of FIGURES 1 and 2, there is shown one embodiment of the present invention which includes a housing frame 1 having a U-shaped cross section. Frame 1 is provided wtih openings in which are slidably disposed a plurality of slides 2, the slides being arranged side by side and parallel to one another for movement in a direction parallel to their longitudinal axes. Each slide 2 carries a nut 3 which is in threaded engagement with a threaded portion 5 of an adjustable tuning spindle 4. One end of spindle 4 is preferably pointed and is arranged to actuate a rocker arm 6 which is pivotably mounted on support 7. A gear sector 8 is connected to the pivot shaft of rocker arm 6 so as to rotate together with the rocker arm, sector 8 being provided with gear teeth and being arranged to mesh with a toothed pinion 9. Pinion 9 is mounted on the shaft of a rotary variable capacitor 10 for permitting the capacitor 10 and pinion 9 to rotate in unison. Capacitor 10 has one side connected to ground and its other side connected to a terminal A through the intermediary of an inductor 26. As will be described in greater detail below, capacitor 10 serves as a tuning capacitor in a resonant circuit for tuning the circuit throughout a selected frequency band. The assembly of rocker arm 6, gear sector 8, pinion 9 and capacitor 10 is biased into an initial position by a return spring 6′ connected to gear sector 8.

The other end of the spindle 4 carries a tuning knob 12 which is mounted on the spindle 4 for axial movement by means of a sleeve 11. The end of the spindle 4 is axially displaceable with respect to the sleeve 11 but is prevented from rotation with respect thereto due to the fact that the associated end of spindle 4 has flattened sides and is disposed in an internal bore formed in sleeve 11 and having a corresponding cross section.

A head 13 is connected to the end of slide 2 which is nearest tuning knob 12, the head 13 being disposed around sleeve 11 and being provided with an annular groove 14 formed in its outer lateral wall. Disposed in the groove 14 is an inwardly extending rim 15 of a tube 16 constituting the push button according to the present invention, the tube 16 being disposed around head 13 and carrying an operating means 17 in the form of a radially extending projection. Disposed above all of the push buttons 16 is a flat slide 18 arranged for movement above the push buttons in a direction perpendicular to the movement of slides 2, the direction of movement of flat slide 18 being indicated by a double-headed arrow in FIGURE 2. Flat slide 18 is provided with a plurality of approximately V-shaped recesses 19 one such recess being provided for each push button. Each recess is provided with two camming surfaces 20 arranged to cooperate with a respective one of the operating means 17.

According to the present invention, each push button 16, together with its associated projection 17, is arranged for rotation with respect to its associated head 13 and slide 2 into any one of a plurality of selected angular positions. These angular positions are selected so that the projection 17 can initially come into contact either with one of the camming surfaces 20 or with the central portion of recess 19, which is disposed between the two camming surfaces 20. Thus, depending on the selected angular position of a push button 16, when this button is depressed (toward the left in the drawings), it will either come into contact with one of the camming surfaces 20 and thus shift the slide 18 in one of its directions of movement, or will move into the central region of recess 19 and hence will not impart any movement to the slide 18. Push button 16 is arranged so that its rotation will be opposed by a certain amount of frictional resistance supplied by the outer wall of head 13. Push button 16 and head 13 are preferably aranged so that the amount of friction between them is great enough to prevent the slide 18 from inducing any rotation in the push button and yet small enough to permit the push button to be manually rotated into its desired angular position before being depressed.

Between tuning knob 12 and head 13 there is disposed a compression spring which tends to urge the knob into an extended position.

At the lower end of flat slide 18 there is provided a link 21 carrying two contact-supporting strips 22, each of these strips carrying a two-prong switch contact. These contacts are associated with a tuner having a frequency band selector switch 23. In the lowermost position of the slide 18 and strips 22, as indicated by the line labeled VHF I, the contacts carried by strips 22 move to a position in which a positive voltage is supplied to the tubes of the VHF channel and in which the VHF I band is tuned in by the series connection of coils 24, 25 and 26, coil 25 being connected to coil 26 via terminal A. When slide 18 is in its central position, which is indicated by the line VHF III and which is the position illustrated in FIGURE 2, the switch contacts on strips 22 again supply a positive voltage to the tubes of the VHF channel, but only coils 25 and 26 are connected in series for tuning in the VHF III frequency band. Finally, in the uppermost position of slide 18, as indicated by the line labeled UHF, a positive voltage is supplied to the tubes of the UHF channel and the UHF band is tuned in by a resonant circuit whose only inductance is the UHF coil 26, which could, for example, be constituted by the inner conductor of a tank circuit. One such switch arrangement 23 is preferably provided at the input of each resonant circuit in the receiver. For example, one such switch arrangement may be provided for an input circuit, for an oscillator circuit, and, if required, for an UHF-band filter or a VHF-band filter.

If for example the circuit elements 10, 24, 25 and 26 show the elements of one of a RF-bandfilter circuit, the incoming energy is transmitted from the antenna or a RF-amplifier stage to a point at the hot end of the circuit, preferably at the coil 26 near or at the stater of the variable condenser 10.

Figure 2A:
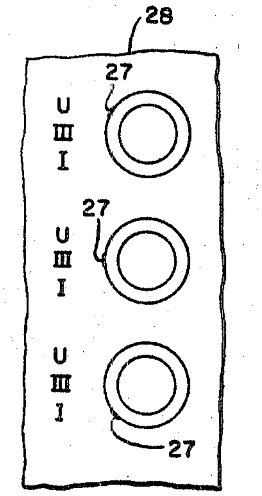
FIGURE 2*a* is a front elevational detail view of a portion of the arrangement of FIGURE 2.

In order to indicate the frequency range selected by each push button, a marking 27 is disposed on each push button 16, the position of this marking indicating the selected angular position of that push button. For identifying each push button angular position, the face plate 28 may be provided with suitable indicia, as is shown in the front elevational view of FIGURE 2*a*. Thus, when a marking 27 is opposite the label U, the associated push button is arranged to select the UHF frequency band. Similarly, if the marking 27 is opposite the label III, the push button is arranged to select the VHF III band, and if the marking 27 is opposite the label I the push button is arranged to select the VHF I band.

In place of the single operating means 17 associated with each push button, a plurality of operating means having a predetermined angular spacing between them can be employed. It is also possible to provide operating means in the form of steps or in the form of a curved path on the inwardly extending surface of the push button 16. Moreover, rockers or push rods could be provided in place of the flat slide 18 for actuating the frequency band selector switch 23.

As is best illustrated in FIGURE 1, each of the slides 2 is provided with a detent, or camming surface 29, arranged to cooperate with a suitable latch 30. At least one compression spring 31 is provided between the latch 30 and the floor of frame 1. In addition, a return spring 32 is connected between each slide 2 and the frame 1. Each return spring 32 applies a biasing force which tends to return its associated push button assembly into an extended position, this being the position shown for the upper and lower push buttons of FIGURE 2. At the same time, after a push button has been depressed, the latch 30 engages a notch 30′ at the bottom of the slide 2 for holding the push button in a depressed position, i.e., that of the central push button of FIGURE 2. When a different push button is depressed, it first causes the latch 30 to ride downwardly on the oblique surface of detent 29 and thus permits the previously depressed push button to be released and to be returned, under the action of its spring 32, to its extended position. When the push button which is being depressed reaches its final depressed position, latch 30 is urged into the groove 30′ formed in the lower surface of the slide 2 associated with that push button, and this push button is held in its depressed position, with its spindle 4 bearing against rocker arm 6.

The arrangement shown in FIGURES 1 and 2 operates as follows:

When the push buttons are in the positions shown, the operating means 17 of the depressed central push button will have moved the slide 18 into the VHF III band selecting position. The end of spindle 4 of this central push button bears against rocker arm 6 and causes capacitor 10 to have a certain capacitance value, thus tuning the associated resonant frequency to a certain frequency, or channel.

In order to vary this frequency within the selected band, it is only necessary to rotate the associated knob 12, which is maintained in an extended position with respect to its associated push button by the spring interposed between itself and head 13. The rotation of knob 12 causes the threaded portion 5 of spindle 4 to rotate with respect to nut 3 and thus causes the tip of the spindle to move in one longitudinal direction or the other so as to vary the setting of rocker arm 6, and hence the capacitance of capacitor 10, over a continuous range corresponding to the frequency range of the selected band.

If now the upper push button of FIGURE 2 is depressed, the operating means of this push button being set to select the UHF band, this operating means first contacts the upper camming surface 20 of its associated recess 19 and, as the push button is moved into its fully depressed position, operating means 17 causes slide 18 to move upwardly into its UHF band selecting position. At the same time, the previously depressed push button is released and returns to its extended position. It is now the spindle of the upper push button assembly which bears against rocker arm 6 for controlling the capacitance of capacitor 10. Tuning of the UHF band can be accomplished in the same manner as that described above by rotating the associated knob 12.

Finally, if the lowermost push button of FIGURE 2, which is set to select the VHF I band, is depressed, the uppermost push button is released and slide 18 is moved into its VHF I band selecting position. It is now the spindle of the lowermost push button which bears against rocker arm 6 and which controls the capacitance of capacitor 10. It should be noted that once a knob 12 has been adjusted to select a particular channel, it will always act to select the same channel whenever its associated push button is depressed.

It may thus be seen that each push button of the tuning arrangement according to the present invention can be arranged to select a particular frequency band simply by rotating this push button into an appropriate position, and that the knob of each push button can be rotated to select a predetermined channel in its associated band. Thus, each push button arrangement can be readily adjusted so that when it is depressed it automatically selects a particular frequency band and a particular channel in that band.

In further accordance with the present invention, the push button 16 with an operating means 17 can be replaced by another push button knob not provided with operating means when it is desired to have the push button operate for example, as an on-off switch, or as a fine tuning or focusing knob. The replacement of one push button by another can be carried out simply by pulling off the push button 16, which may be made of plastic and which is only held by the detent action between rim 15 and groove 14, and by replacing it with a different push button.

Without departing from the principles of the present invention, the marking 27 could be in the form of a window, preferably provided with a magnifying lens, for viewing a suitable marking on the associated knob 12, which marking indicates the particular channel to which the knob is adjusted.

Also in accordance with the present invention, it is desirable to construct each push button arrangement in such a way that the tuning knob 12 is surrounded by the push button 16 and does not, when the push button is not depressed, extend beyond the front edge of its associated push button. Only when the push button is depressed, will the tuning knob 12 extend beyond the push button and be in a position to be rotated for selecting a particular channel. It is also possible, however, to cause the push button knob 16 to remain in its position and to permit its associated tuning knob to pop out.

Figure 3:
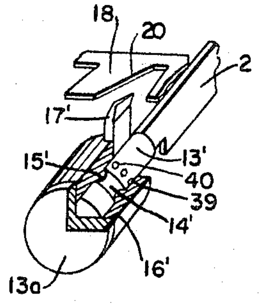
FIGURE 3 is a perspective view of a modified embodiment of a portion of the arrangement of FIGURE 1.

In the embodiment of FIGURES 1 and 2, the push button is open at its front end for permitting the knob 12 to extend outwardly therefrom. However, it is also possible, in accordance with the present invention, to close the front end of the push button 16 and to carry out the channel-selecting operations by means of a separate tuning knob which is arranged to advance the associated tuning spindles 4. The push button might then have a cup-shaped configuration, or, as is shown in FIGURE 3, it may have a tubular configuration and have its front end closed off by a separate disc or plate. These elements can be made of plastic, for example, and each one could be of a different color. The closing plate, or disc, may be inserted into a head 13′ disposed within push button 16′, or the head 13′ could have a closed frontal end, in which case a separate plate would not be required.

Referring more specifically to FIGURE 3, there is shown a push button arrangement including a knob 16′ having inwardly extending projections 39, and a head 13′ having a plurality of recesses 40 for receiving the projections 39. The head 13′ has an enlarged end portion **13*a* whose diameter is at least as great as the outer diameter of knob 16′**.

Knob 16′ also carries an operating means 17′ for engaging a recess 20 in slide 18. Head 13′ is provided with a groove 14′ into which fits a boss 15′ of knob 16′ for the purpose of holding the knob 16′ in a predetermined longitudinal position with respect to the head 13′. In this embodiment, either the knob 16′ or the head 13′ must be constructed so as to have a spring action in at least one portion thereof. The projections 39 are preferably constructed as detents to cooperate with recesses 40 in such a way that knob 16′ can be rotated into any one of a plurality of predetermined angular positions for determining the position to which the operating means 17′ will move the slide 18 upon depression of the push button. The arrangement is preferably constructed so that the push button 16′ can be removed from the head 13′, or so that the head 13′ can be removed from the slide 2, in a simple manner.

As in the embodiments of FIGURES 1 and 2, the arrangement shown in FIGURE 3 can be modified by replacing the flat slide 18 with a lever or a rocker arm.

Figure 4:
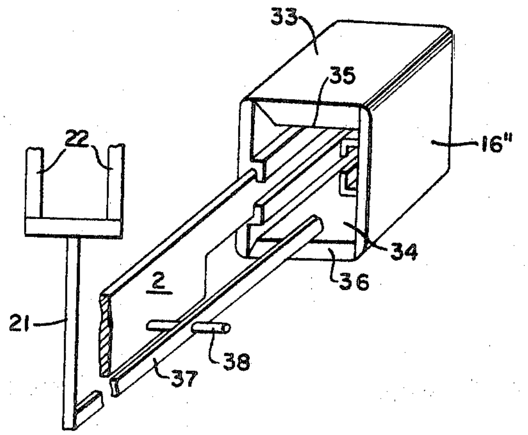
FIGURE 4 is a perspective view of a modified embodiment of a portion of the arrangement of FIGURE 1.

Referring now to FIGURE 4, there is shown a push button arrangement in which either one of two frequency bands can be selected by pulling the push button 16″ of rectangular cross section off the slide 2, rotating the push button by 180°, and placing it back on the slide 2. In this arrangement, the selected frequency range is determined directly by the angular position of a lever 37 which is pivotally mounted on slide 2 by means of a pivot pin 38. The lever 37 is connected to move the frequency band selecting contacts associated with a selector switch. The walls 33 and 34 of the push button are of different thicknesses, each wall being provided with a respective oblique camming surface 35 or 36. The inner surface of each of the other two walls of push button 16″ is provided with a receiving channel for slide 2, the distance between one channel and the outer surface of wall 34 being equal to the distance between the other channel and the outer surface of wall 33. In the illustrated embodiment, wall 33 is thicker than wall 34.

Thus, when the push button has the orientation shown in FIGURE 4, and is depressed, the angular position of lever 37 will be determined by the thickness of wall 34 and the lever will move its associated switch contacts into a first position. Then, in order to select a different frequency band, it is only necessary to remove the push button 16" from slide 2, turn the push button by 180°, and replace the push button on slide 2 so that it is now the thickness of wall 33 which will determine the angular position of lever 37. The thickness of wall 33 differs from that of wall 34 by a sufficient amount to cause the lever to move its associated contacts into a different frequency selecting position.

In further accordance with the present invention, it would also be possible to cause the rotation of the push button to directly effect the frequency band selection, prior to the depression of the push button, so that the depression of the push button will only act to effect the desired, predetermined channel selection.

In the arrangement of FIGURE 4, the lever 37 might have its other end pivotally connected to a link 21 carrying the two strips 22, the strips 22 being associated with a selector switch of the type shown in FIGURE 2.

Figure 5:
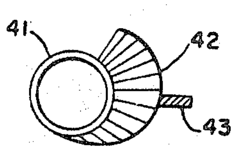
FIGURE 5 is an axial end view of a modified push button according to the present invention.

Other forms of construction for the operating means are also possible. FIGURE 5 shows one such modified form of construction in which the push button 41, which corresponds to the push button 16 of FIGURE 1, is provided with an operating means 42 presenting a camming surface having a continuously variable radius. The front surface of this operating means is beveled to permit the front edge of a lever 43 to ride up along this surface when the push button 41 is depressed. The lever 43 may be pivoted about a vertical axis and may have its other end connected to drive a link and strip arrangement of a band selector switch of the type shown in FIGURE 2. The position to which the lever advances, such switch will be determined by the point on the camming surface of operating means 42 upon which the lever comes to rest after the push button 41 has been fully depressed.

Figure 6:
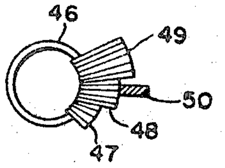
FIGURE 6 is a view similar to that of FIGURE 5 of another modified form of the push button according to the present invention.

In the arrangement of FIGURE 6, a push button 46 is provided with operating means having the form of a plurality of segments 47, 48 and 49 presenting a radially-directed, step-wise camming surface. The leading edge of each segment is beveled to permit the free end of a lever 50, which has a vertical pivot axis, to ride up therealong as the push button 46 is depressed (the depression of the push button 46 advancing it out of the plane of the figure). The position to which the lever 50 will move its associated band selector switch will be determined by the particular step of the camming surface upon which it comes to rest.

Figure 7:
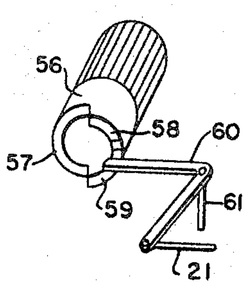
FIGURE 7 is a perspective view of a further modified version of the push button according to the present invention.

Referring now to FIGURE 7, there is shown an arrangement in which the push button 56 is provided with operating means in the form of an axially extending bearing surface having a plurality of steps 57, 58 and 59. A rocker arm 60 is pivoted about an axis 61 and is arranged to have one end engaged by the operating means associated with push button 56 and the other end connected to control the position of a link 21 which may be associated with a band selector switch of the type shown in FIGURE 2. When push button 56 is depressed, one of its steps 57, 58, or 59 will come to bear against arm 60 so as to move link 21 into one of its predetermined positions, the surface which comes into contact with the lever, and hence the position to which link 21 is moved, depending on the angular position of push button 56.

Figure 8:
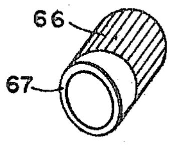
FIGURE 8 is a view similar to that of FIGURE 7 of yet another modified form of construction of the push button according to the present invention.

FIGURE 8 shows an arrangement which similar to that of FIGURE 7 except that the push button 66 here, has an operating means constituted by an axially extending bearing surface 67 whose axial extent varies in a continuous manner. This push button may be associated with a rocker arm identical with that shown in FIGURE 7, the position to which the rocker arm is rotated when the push button is depressed being determined by the angular position of the push button.

It will be understood that the above description of the present invention is susceptible to various modifications, changes, and adaptations.

What is claimed is:

1. A push-button tuner mechanism for selecting the frequency band to be received by a broadcast receiving set capable of receiving a plurality of frequency bands, comprising, in combination:

(a) a plurality of longitudinally movable slides arranged side by side;

(b) a plurality of push buttons each operatively supported by a respective one of said slides for longitudinal movement together with its associated slide, at least one of said push buttons being capable of assuming at least two different predetermined angular positions with respect to its associated slide;

(c) frequency band selector means including means movable into a plurality of switching positions each of which causes a particular frequency band to be selected;

(d) operating means forming a structural unit with said at least one push button and operatively associated with said selector means for moving the latter into a selected one of its switching positions when said one push button is depressed, the switching position selected being determined by the angular position of said one push button; and (e) means, associated at least with said one push button, for tuning within a selected frequency band and adjustable only when said one push button is depressed, said tuning means including a rotatable spindle, a nut threaded thereon and a tuning knob operably connected for rotating said spindle to effect adjustment.

2. An arrangement as defined in claim 1, further comprising a plurality of heads each rigidly connected to a respective one of said slides and carrying the associated one of said push buttons in such a manner that each said push button is rotatable with respect to its associated head.

3. An arrangement as defined in claim 1 wherein said at least one push button has a tubular form and the tuning knob is disposed radially inwardly of said one push button for continuous rotation independently thereof so as to tune to a particular channel within the selected frequency band, the tuning knob being exposed for manual actuation only when said one button is depressed.

4. An arrangement as defined in claim 1 wherein said operating means are constituted by a plurality of lateral walls of said at least one push button, said lateral walls being of differing thicknesses and having beveled leading edges.

5. An arrangement as defined in claim 2 wherein each of said heads is provided with a plurality of recesses corresponding to the angular positions which its associated push button is capable of assuming, and each said push button is provided with at least one projection disposed for entry into said recesses of its associated head.

6. An arrangement as defined in claim 1, said frequency band selector means including a flat slide to be driven by said operating means to cause particular fresuency bands to be selected, said flat slide being provided with a plurality of approximately V-shaped recesses, one for said operating means of each of said push buttons, each said recess having two opposed bearing surfaces, said operating means of each said push button being arranged to coact with the surfaces of its associated recess, when its associated push button is depressed, for displacing said flat slide in accordance with the angular position of its associated push button.

7. An arrangement as defined in claim 1 wherein said operating means comprise surface means on said at least one push button.

8. An arrangement as defined in claim 7 wherein said surface means are radial.

9. An arrangement as defined in claim 7 wherein said surface means are axial.

10. An arrangement as defined in claim 7 wherein said surface means are stepped.

11. An arrangement as defined in claim 7 wherein said surface means form a continuous surface.

References Cited

UNITED STATES PATENTS

| | | | |
|---|---|---|---|
| 2,237,487 | 4/1941 | Hobing | 74—10.33 |
| 2,260,599 | 10/1941 | Benton et al. | 74—10.33 |
| 2,513,353 | 7/1950 | Owens | 74—10.33 X |

MILTON KAUFMAN, Primary Examiner

U.S. Cl. X.R.

334—7